June 17, 1952  T. W. ROYER ET AL  2,600,924
STUD EXTRACTOR
Filed June 12, 1946  2 SHEETS—SHEET 1
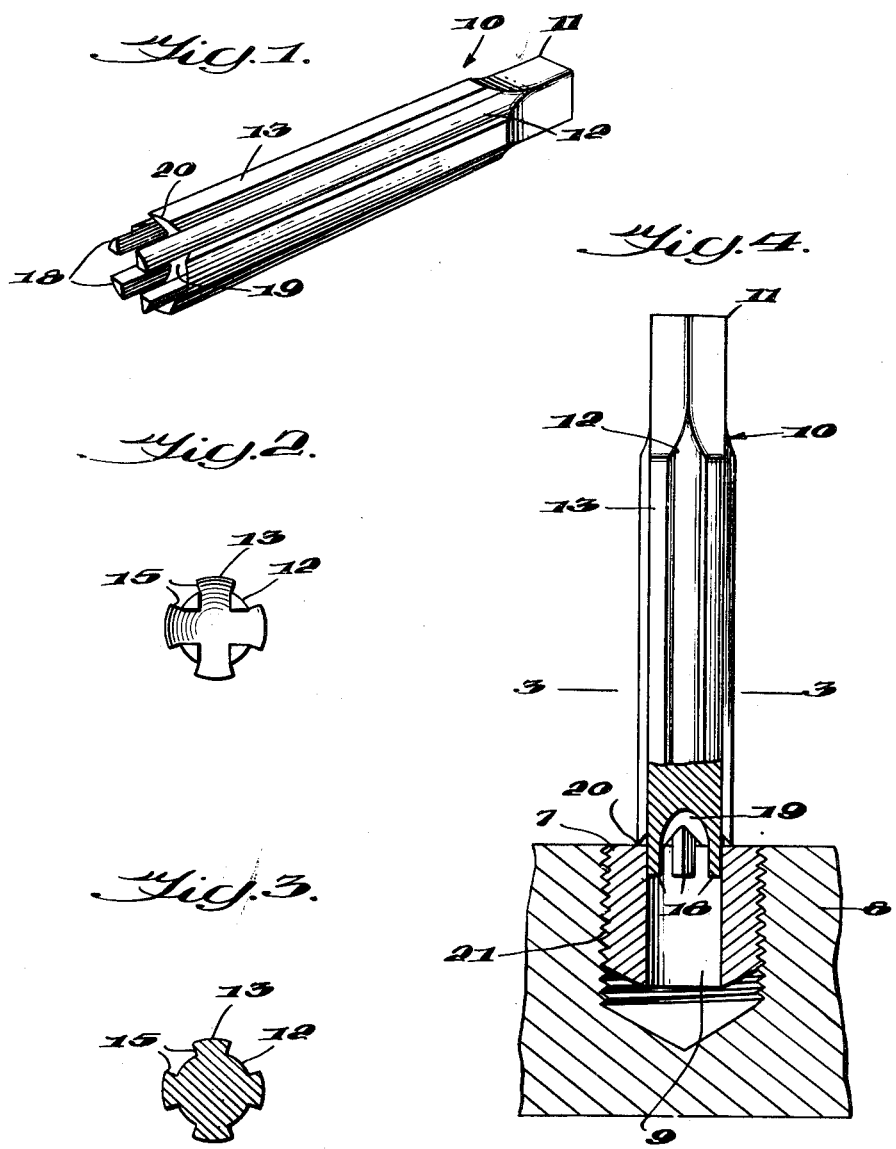
Inventor
Thurber W. Royer
and
Frieda F. Royer
By
G. W. Sievers  Attorney June 17, 1952  T. W. ROYER ET AL  2,600,924
STUD EXTRACTOR
Filed June 12, 1946  2 SHEETS—SHEET 2
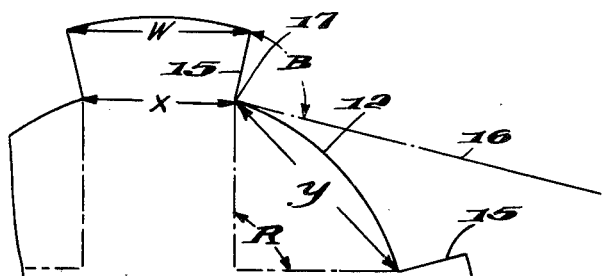
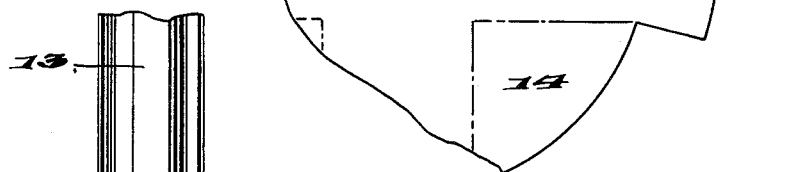
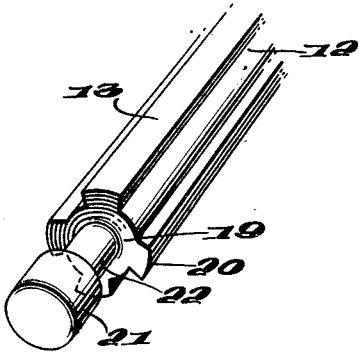
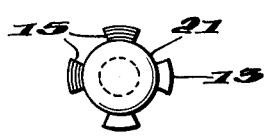
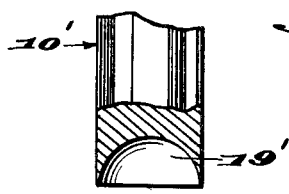
Inventor
Thurber W. Royer
and
Frieda F. Royer
By G. W. Sieves
Attorney Patented June 17, 1952

2,600,924

UNITED STATES PATENT OFFICE 2,600,924

STUD EXTRACTOR

Thurber W. Royer and Frieda F. Royer,
Arlington, Va.

Application June 12, 1946, Serial No. 676,326

4 Claims. (Cl. 81—71)

This invention relates to improvements in extractors, and is particularly directed to extractors for removing embedded broken stud bolts, and the like, which have the head or body of the bolt broken off flush or below the plane surface of an engine block or other threaded member in which the stud is embedded.

It is the customary practice in removing broken and embedded stud bolts from a block, or the like, to first drill a straight-sided hole in the center of the stud, parallel to its longitudinal axis, and of a sufficient length therein to permit the insertion of the extracting tool. The diameter of the hole drilled in the stud may vary, according to the diameter of the stud and of the extractor to be used. Into this hole is inserted an extracting tool, i. e., a tool that will make it possible to apply torque to the broken stud and remove it from the hole in which it is embedded.

This method of first drilling and then subsequently backing out the broken stud is used because every effort is made to avoid damaging the female threads in the block, thus leaving them in condition for the insertion of a new unbroken stud bolt of standard size and thread, thus eliminating the undesirable and costly job of re-drilling and re-tapping these female threads for an oversize stud.

Heretofore, there have been three general types of extracting tools for removing broken stud bolts which can be generally classified according to the manner in which they grip or obtain their purchase on the broken stud. These classifications are, first, the tapered type which is driven into the hole previously drilled in the stud and which engages the wall of the hole by any number of designs of ridges or faces; second, the straight shank type with V-shaped ridges disposed around the periphery of the shank and which is driven into the hole previously drilled in the stud. In this type of extractor, the V-shaped ridges which extend parallel to the major axis of the shank of the tool, form grooves in the wall of the hole by causing the metal of the stud to flow horizontally, as the extractor is driven into position in the stud; and, third, the chisel type having a non-tapered shank and chisel pointed lands or flutes which cut their own grooves as the tool is driven into position.

All of the above types have one or more of the following inherent disadvantages. Some types cause an outward pressure to be exerted against the wall of the hole drilled in the stud. This pressure is developed either in the process of driving the extractor into position or when torque is applied to the extractor in an attempt to remove or back out the broken or frozen stud, or this pressure may develop at both operations. In either or both cases, pressure thus developed is transmitted through the body of the stud to the stud threads and causes them to bind even more tightly in the mating threads in the block. All tapered shank extractors have the inherent disadvantage of having a relatively short area of engagements between the gripping members of the extractor and the straight bore of the hole in the stud.

A further difficulty with present chisel type extractors is that if the operator does not use extreme care and skill in inserting the extractor in the stud hole, the tool will get out of line as it enters the hole and will gouge or cut through the walls of the broken stud into the female threads in the block and thereby cause the very damage that the use of the tool is endeavoring to eliminate.

Another difficulty is that there is no assurance as to where extractors will break, if they break.

It is an object of this invention to provide an extracting tool that overcomes the chief difficulties found in present extracting tools.

A specific object of this invention is to provide a pilot or guide for the driven chisel or gouge type extractor which provides a positive aligning of the extractor in the hole and makes it impossible for the tool to get out of line as it penetrates into the hole.

A further object of this invention is to provide an extracting tool of the chisel or gouge type that does not cause the stud to expand as the tool is driven into the hole to cause or permit the stud to expand during the backing out of the broken stud and actually will cause an inward pressure to be developed in the metal of the stud.

A yet further object of this invention is to provide an extractor that fills the entire hole drilled in the stud and thereby prevents slippage of the tool in the hole or displacement of the metal in the stud as torque is applied thereto.

A further object of this invention is to provide an extractor that is provided with a predetermined breaking point in or just below the torque-tool gripping member to prevent the extractor from breaking off in the stud.

A still further object of this invention is to provide an extracting tool that can be rotated in either direction, so that either right or left hand studs may be backed out or run through.

Another object of this invention is to provide an extractor which provides a positive grip along the entire length of the extractor in contact with the stud.

Another object of this invention is to provide an extracting tool that does not become wedged in the stud during the insertion thereof and may be readily removed from the stud after the same has been extracted.

A yet further object of this invention is to provide an extracting tool that fills the hole drilled in the stud to such an extent that any harmful tendency of the lands or flutes of the extractor to chip or ream the metal from the stud during application of torque is prevented.

A further object of this invention is to provide a tool that is effective in extracting broken stud bolts and yet is simple and inexpensive to manufacture.

Other objects and advantages of this invention will become apparent as the discussion proceeds and is considered in connection with the accompanying claims and drawings and wherein:

Fig. 1 is a perspective view of the extractor as embodied in this invention and shows one form of the pilot or guide;

Fig. 2 is an end plan view of the extractor shown in Fig. 1;

Fig. 3 is a cross sectional view of the extractor embodied in this invention, taken on the line 3—3 of Fig. 4;

Fig. 4 is a side elevation in partial section of the extractor embodied in this invention, showing a portion of the tool and the broken stud bolt broken away and showing the pilot in the drilled hole of the broken stud;

Fig. 5 is an illustrative schematic sectional view of the extractor embodied in this invention and is provided to illustrate more clearly the significance of the angles of the face of the ribs or lands to the arcuate sides of the shank;

Figs. 6, 7 and 8 are longitudinal side, end and perspective views, respectively, of a modification of the guide or pilot embodied in this invention; and Fig. 9 is a perspective view showing a further modification of this invention wherein the extracting tool is provided with a concave cutting receiver in one end of the shank.

In the drawings, wherein for the purpose of illustration is shown a preferred embodiment of this invention, the numeral 10 designates an elongated cylindrical shank having a hexagonal, square, or other collar 11, provided on one end thereof, for the purpose of receiving a wrench, which applies the necessary torque to the tool. The collar 11 is made smaller in cross-sectional area than the shank to enable the extractor to break at or in the collar 11, if too great a torque is applied to the tool. Other means of making the collar or top of the shank weaker than the bottom, such as drilling a hole in the collar, bonding the shank or giving a brittle temper thereto may be adapted. Extending parallel with the longitudinal axis of the shank 10, are inwardly tapering ribs or lands 13 carried upon and integral with the shank 10 and are arcuate. These lands 13 are arcuate about their outer diameter and being inwardly tapering are smallest at their base or point of contact with the surface 12 of the shank, as shown more clearly in Figs 2, 3 and 5. As shown particularly in Fig. 5, these lands form segments of the tool as a whole and divide the cylindrical surface of the shank into segments 14 which form a right angle R at their base. The lands 13 have sides or faces 15 which preferably should be parallel to each other and the longitudinal axis of the shank. Further, it is to be understood that these faces 15 may taper inwardly slightly from the bottom or cutting end to the top or handle end of the shank to the top. If such a slight taper is provided, this will give additional negative outward or inward pressure to the stud. The specific angle of the faces 15 is critical within a certain range.

For a better understanding of the importance of the angle of these faces, reference is here made to the schematic view of Fig. 5. A line or plane 16 is drawn tangent to the arcuate face 12 of the shank 10, at the point or line 17, where the face 18 and the side of the shank 12 intersects. This angle, here designated as the angle beta, in the preferred embodiment of this invention, is less than 90°. A variation of this angle from 90° down can be made without departing from the spirit of this invention. In other words, in the preferred embodiment of this invention, the extent of the angle beta is 90° minus. It is here pointed out, however, that the angle beta in other embodiments of this invention is not critical and may be greater than 90°. The significance of the angle beta will be discussed at length later.

The number of segments formed by the lands or ribs 13 is illustrated in the drawings to be four. However, it is to be understood that this number may vary and the showing of four is made only for the purpose of illustration. It is likewise pointed out that the relation of the width X (Fig. 5) of the base of the lands 13, to the width W will vary according to the angle beta, and the width of the base of the lands X, and its relation to the cord Y of the segment of the arcuate face of the cylindrical shank 12 formed between the lands 13, can be varied without departing from the spirit of this invention. The height of the lands 13 may likewise be varied without departing from the spirit of this invention.

As shown in Fig. 4, the extracting tool is illustrated with a broken stud bolt 7, which is embedded in a block or head 8. A bore or hole 9 is first drilled into or through the broken stud 7, and the extracting tool 10 is inserted into this hole 9.

A pilot or guide 18 is provided on the end of the shank of the extractor opposite the collar 11, assuring a positive aligning of the extractor in the hole 9.

In the preferred embodiment of this invention, the pilot 18 takes the form of a plurality of prongs or fingers as best shown in Figs. 1 and 4. It is noted that these prongs or fingers 18, are lateral extensions of the segments of the shank 10, lying between the lands 13 and may be formed by forging or by running a hob, or other cutting tool (not shown), from the extremity of one rib or land 13 to the extremity of the axial opposite rib or land and then running the same to any desired depth. The hob is then removed and rotated to the next pair of lands where it is again run to the same depth until each pair of lands are milled or cut out. This milling operation will form a concave surface 19 in the bottom of the shank as shown by Figs. 1 and 4, which is adapted to receive cuttings from the stud bolt 7, as the extractor is driven into the hole 9. In running the hob or mill, knife edges 20 will be cut on the lands 13. This knife edge 20 preferably should then be tempered or hardened and serves as a chisel or gouge for cutting into the sides of the broken stud bolt 7.

The fingers 18 are as pointed out above, extensions of the segments of the shank 10 formed between the lands 13, and, therefore, have an outer circumference equal to the outer circumference 12 of the shank 10, thus permitting the same to fit in the hole 9, as that of the shank. It will be seen from the drawings, and preferably from Fig. 4, that the fingers 18 will serve as a guide or pilot for the extracting tool as it is driven into the hole 9 and will prevent the deflecting of the tool at an angle. The extractor then being piloted or guided into the hole 9 will always have its center parallel to and coincident with the center of the hole and thus the tool is prohibited from veering off at an angle and gouging into threads 21 of the block or head 8.

Again referring to the diagrammatic view shown by Fig. 5, reference is again made to the angle beta formed between the faces 15 of the lands 13 and the arcuate surface of the shank 12. The angle beta having an angle of less than 90°, the faces take an inwardly tapering configuration. As the extractor is driven into the hole 9 of the stud bolt 7, the knife edges 20 of the lands 13 will cut a channel (not shown) into the stud bolt and the walls of the stud 7 will be drawn inward or away from the hole. As torque is applied to the extractor in order to rotate the stud, the male threads will be urged loose from the companion female threads rather than causing or permitting them to jam more tightly together. This is true whether the lands taper toward the top or are straight. During the extraction of the stud, the combination of the snug fitting and arcuate shank 12 and the inwardly tapering faces 15 of the lands 13 will grip the wall of the hole 9 of the stud, so that none of the stud metal can flow either circumferentially or in an outward radial direction, i. e., the hole will be prevented from reaming out and the stud will be prevented from expanding.

A modified form of the pilot 18, shown in Figs. 6, 7 and 8, may be used, if desired, in place of the prongs or fingers 18. This modified form of pilot is provided with a cylindrical shank 21, having a diameter equal to the diameter of the arcuate cylindrical surface 13 of the shank 10. The exact length of the cylindrical pilot 21 is immaterial, but it should be of a sufficient length to give the pilot the necessary guiding action required. A second shank 22 somewhat smaller in diameter than the main body portion 21 is affixed to the end of the extractor 10 and carries the pilot proper. The concave end 19 of the shank 10 and the somewhat smaller member 22 provide a space for the accumulation of the cuttings from the stud bolt 7.

In a modification of this invention shown in Fig. 9, the pilot is omitted and a concave cutting receiving member 19 is provided in the end of the shank 10' of the tool.

It is to be understood that the forms of this invention, shown and described, are to be taken as preferred examples of the same and that various changes in the size, shape, number of lands, and width thereof, type of pilot used and angle variations of the faces 15, as well as the type of mill and method of manufacture may be resorted to without departing from the spirit of this invention.

We claim:

1. An extractor for removing broken stud bolts comprising a cylindrical shank, lands on said shank separating said shank into segments, said lands having an arcuate top surface substantially throughout the length thereof, said lands having a flat surface on the sides thereof extending substantially parallel to the axis of the shank of said extractor, the base of said lands lying adjacent the cylindrical shank being of a lesser width than the top surface of said lands, and the flat surface of each of the sides of said lands forming an angle with a plane tangent to the cylindrical shank through the point of intersection of the flat surface on each side of the lands and the shank of less than 90 degrees, and a pilot carried upon one end of said shank, said pilot being formed by lengthwise extensions of the segments of said shank beyond the terminus of said lands, said shank and lands being provided with a hollow portion for receiving chips formed in the end thereof separating said extensions.

2. An extractor for removing broken stud bolts comprising a cylindrical shank, lands on said shank separating said shank into segments, said lands having an arcuate top surface substantially throughout the length thereof, said lands having a flat surface on the sides thereof extending substantially parallel to the axis of the shank of said extractor, the base of said lands lying adjacent the cylindrical shank being of a lesser width than the top surface of said lands, and the flat surface of each of the sides of said lands forming an angle with a plane tangent to the cylindrical shank through the point of intersection of the flat surface on each side of the lands and the shank of less than 90 degrees, a pilot carried upon one end of said shank, said pilot being formed by lengthwise extensions of the segments of said shank beyond the terminus of said lands, said shank and lands being provided with a hollow portion for receiving chips formed in the end thereof separating said extensions, a wrench receiving member on the end of said shank opposite the end carrying said pilot, said extractor having a section weaker in torsional strength than any equivalent axial linear section of the stud engaging portion of the extractor, said weak section disposed between the wrench receiving member and the stud engageable portion of said extractor, each of the lands having a cutting edge formed on the end thereof lying between the extensions forming the pilot, and a driving head on the end of said shank opposite the end carrying the pilot for receiving a blow to force said extractor into an opening provided in said broken stud bolt.

3. An extractor for removing broken stud bolts comprising a cylindrical shank, lands on said shank extending longitudinally thereof and separating said shank into segments, and a pilot carried upon one end of said shank, said pilot being formed by lengthwise extensions of the segments of said shank extending beyond the terminus of said lands, said shank and lands being provided with a hollow portion for receiving chips formed in the end thereof separating said extensions.

4. An extractor for removing broken stud bolts comprising a cylindrical shank, not more than four lands on said shank extending longitudinally thereof and separating said shank into segments; a pilot carried upon one end of said shank, said pilot being formed by lengthwise extensions of the segments of said shank extending beyond the terminus of said lands, said shank and lands being provided with a hollow portion for receiving chips formed in the end thereof separating said extensions, said lands terminating in chisel points between said extensions, a driving head on the end of said shank from opposite the pilot for receiving a blow thereon to drive the extractor into an opening provided in the stud bolt, and a wrench receiving member on said shank adjacent the driving head, said lands extending throughout the length of said shank from the pilots to the wrench receiving member.

THURBER W. ROYER.
FRIEDA F. ROYER.

REFERENCES CITED

The following references are of record in the file of this patent:

UNITED STATES PATENTS

| Number | Name | Date |
|---|---|---|
| 216,023 | Crane | June 3, 1879 |
| 1,075,710 | Goodwin | Oct. 14, 1913 |
| 1,398,156 | Schroder | Nov. 22, 1921 |
| 1,547,944 | Murphree | July 28, 1925 |
| 1,554,287 | McGuckin | Sept. 22, 1925 |
| 1,844,241 | Bryant | Feb. 9, 1932 |
| 2,121,197 | Jackman | June 21, 1938 |